Nov. 15, 1960 J. DAIN ET AL 2,960,658

MICROWAVE AMPLIFIERS

Filed Oct. 10, 1958

INVENTORS:

John Dain
and
Percy Charles Ruggles

By: Baldwin & Wight, ATTORNEYS

United States Patent Office 2,960,658
Patented Nov. 15, 1960

2,960,658

MICROWAVE AMPLIFIERS

John Dain, Chelmsford, and Percy Charles Ruggles, Great Baddow, England, assignors to English Electric Valve Company Limited, Kingsway, London, England, a British company Filed Oct. 10, 1958, Ser. No. 766,514

Claims priority, application Great Britain Dec. 12, 1957

3 Claims. (Cl. 330—44)

Figures 1, 2:
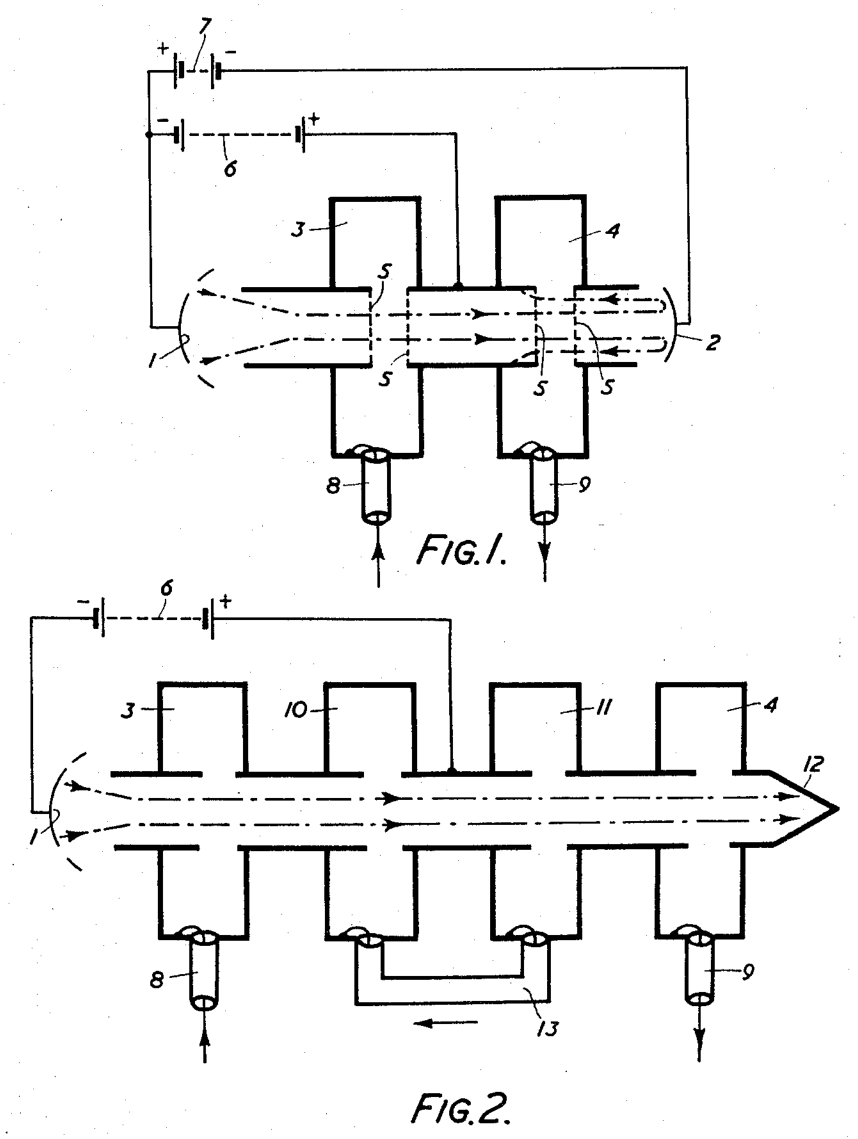

This invention relates to microwave amplifiers and more specifically to microwave amplifiers of the kind in which amplification is obtained by interaction between an electron beam and at least one resonator which is coupled thereto and adapted to modulate the velocity of the electrons thereof. So-called klystron amplifiers constitute one of the best known microwave amplifiers of this kind.

Broadly speaking, klystron amplifiers may be divided into two classes, namely, the so-called "direct" type in which the electron beam is projected on to a collector electrode passing in succession at least two resonators, of which the first (that nearest the gun) serves as the input resonator and the last (that nearest the collector) serves as the output resonator (if there are more than two resonators the intermediate ones are unconnected) and the so-called "reflex" type in which the beam travels past a resonator towards a reflector electrode which reflects the electrons to pass the same resonator again, this time in the opposite direction.

The direct klystron type of amplifier as at present known has a number of important defects and limitations. If there are only two resonators the power gain is low, a typical figure being only about 10 db for a tube operating at about 10,000 mc./s. If unconnected intermediate resonators are added, in the known manner, the gain is certainly substantially increased but the added cost of the tube is very considerable. The object of the present invention is to justify the added cost by obtaining still more added gain from the additional intermediate resonators provided. Again with known arrangements comprising unconnected intermediate additional cavities, these cavities tend to make it difficult to tune the amplifier to a required frequency. In many cases also, their provision in known manner involves the necessity for a magnetic field to constrain the beam within the so-called drift tube, since the diameter of this tube is limited by consideration due to the need for coupling the beam to the fields within the cavities. As will be seen later the present invention, in certain of its embodiments, enables these defects to be avoided also.

Reflex klystrons are widely used as oscillation generators, but do not lend themselves to convenient use as amplifiers since with known reflex klystrons, the same cavity has to be used both for input and output. They can be used as amplifiers by employing a rat-race or other hybrid unit or power separator to ensure that the input power goes only to the cavity and the output power from the cavity goes only to the output circuit. In general such power circulators, which are well known per se, have three arms and, used in the manner now described, the input arm is used to feed input power to the cavity via a second arm and the said second arm is used to feed power from the cavity to the third or output arm. A reflex klystron employed thus in conjunction with a power separator will give considerably better power gain than an amplifier of the direct klystron type as above described—power gains of the order of 30 db at a frequency of about 10,000 mc./s. are obtainable—but the necessity for providing the power separator is a serious disadvantage since such separators are expensive. In addition the gain is still undesirably limited due to the fact that it varies rapidly with beam current which must approach closely to but not reach the value at which self-oscillation occurs.

The present invention, which is applicable both to amplifiers of the direct klystron type and of the reflex klystron type, seeks to provide improved microwave amplifiers of high gain and stable amplification and which shall not require the provision of hybrid units or other power separators. According to this invention a high gain microwave amplifier of the kind in which amplification is obtained by interaction between an electron beam and at least one resonator coupled thereto and adapted to modulate the velocity of the electrons thereof, comprises an electron beam source, an input resonator coupled to said beam, means for applying input signals to said resonator, an output resonator coupled to said beam to take amplified output from the electrons thereof after they have passed and been modulated by the input resonator, means for taking output signals from said output resonator, and means for applying feedback reaction, insufficient to cause self-oscillation, over at least one intermediate length of said beam which is beyond said input resonator in the direction of electron flight.

Where the invention is applied to microwave amplifiers of the direct klystron type the feedback reaction means comprises at least one pair of additional resonators situated between the input resonator and the output resonator and coupled to the electrons of the beam at the opposite ends of an intermediate length thereof, and a positive energy feedback path between that additional resonator which is nearer the output resonator and the other additional resonator. If desired, there may be at least one further pair of additional resonators between the input and output resonators and coupled to the beam at opposite ends of another intermediate length thereof, the resonators of each such further pair being back coupled through a positive energy feedback path. In general, however, the provision of only one pair of additional resonators is adequate and is to be preferred.

Where the invention is applied to microwave amplifiers of the reflex klystron type, the feedback reaction means are electronic, being obtained by arranging for the electrons, after reflection, to pass the output resonator a second time but in the opposite direction and to be collected before they reach the first resonator in their return flight.

The resonators may be of any kind known per se. Preferably they are cavity resonators coupled to the beam and through which the beam passes, but they may be of the distributed constants type, e.g. constituted by short lengths of helical or other line through which the beam passes. The resonators need not all be resonant at exactly the same frequency. For example, the input and output resonators may be tuned to slightly different frequencies in order to obtain wide band amplification and, in the case of an amplifier of the direct klystron type, wherein a back-coupled additional pair of resonators is provided, said pair may be (for the purpose of wide band amplification) tuned to a frequency slightly different from that of the output resonator.

According to a feature of this invention a high gain microwave amplifier comprises an electron beam source adapted to project a beam of electrons towards a reflector electrode, a pair of resonators coupled to said beam at different points along its path from said source to said reflector electrode, means for applying signals to be amplified to that resonator which is nearer said source, means for taking off amplified signals from that resonator which is nearer said reflector electrode and means for applying operating potentials dimensioned to cause the electrons of the beam to proceed from the source past the two resonators to a point near said reflector electrode, to be reflected at said point, and proceed back past only that resonator which is nearer said reflector electrode. The beam current must, of course, be below the oscillation threshold value otherwise the tube will oscillate.

According to another feature of this invention a high gain microwave amplifier comprises an electron beam source adapted to project a beam of electrons towards a collector electrode, an input resonator coupled to said beam near said source, an output resonator coupled to said beam near said collector electrode, a pair of additional resonators coupled to said beam at spaced points along the same between the input and output resonators, a positive energy feedback path extending from that resonator of said pair nearer the output resonator to the other resonator of said pair, means for applying signals to be amplified to the input resonator, means for taking off amplified signals from the output resonator and means for applying operating potentials dimensioned to cause the electrons of the beam to proceed from the source past the resonators to said collector electrode to be collected thereby. The back coupling between the resonators of the additional pair must, of course, be below the value at which oscillation generation occurs.

The invention is illustrated in the accompanying drawings which show diagrammatically two embodiments, that of Fig. 1 being of the reflex klystron type and that of Fig. 2 being of the direct klystron type. Like references denote like parts in both figures.

Referring to Fig. 1, an electron beam, conventionally represented by chain lines, is projected from an electron beam source which is conventionally represented at 1, towards a reflector electrode 2. In its passage towards the reflector electrode the beam passes in succession through two cavity resonators 3 and 4 of which the former acts as an input resonator and the latter as an output resonator. In the particular tube shown in Fig. 1, grids 5 are shown across the ends of the lengths of drift tube. The provision of such grids is now common in reflex klystrons. Suitable positive potential is applied as shown from a source 6 and appropriate negative potential from a source 7 is applied to the reflector electrode 2. The operating potentials are such that the beam travels past the resonators 3 and 4 in succession to near the reflector electrode where the electrons are reflected and return again past the resonator 4 (more accurately past the usual coupling slot for that resonator). The potentials are such that the returning electrons do not reach a point at which they can couple for a second time with the input resonator 3 but are collected on the drift tube between resonators 3 and 4. Input is applied to the resonator 3 in any convenient known manner, e.g. as shown by means of a co-axial feeder 8. Amplified output is taken off from the resonator 4 in any convenient known manner, as shown by a co-axial feeder 9. The beam current is adjusted to a value slightly below the oscillation threshold value. It will be seen that by virtue of the double passage of the electrons past the resonator 4, regenerative feedback action is electronically obtained over that length of the electron beam extending from past the resonator 4 to the point of reflection and back past said reflector again. There is, however, no significant reaction back on the first cavity 3, for the beam is not returned to it and the drift tube between the two cavities is small enough to cause high attenuation of any microwave energy propagating along it. Accordingly high gain is obtained with only two cavities and without the use of any external power separator. Furthermore the gain, at any prescribed value thereof, will be dependent on beam current to a lesser extent than in a known single cavity reflex amplifier since additional gain is provided by the bunching action of the input cavity 3.

The center frequency of the amplifier of Fig. 1 can be adjusted over a limited range of adjustment of the reflector voltage. The bandwidth may also be increased by turning the two cavities to slightly different frequencies.

In the modification shown in Fig. 2, which is of the direct klystron type, there are four cavities comprising input and output cavities 3 and 4 respectively, and a pair of additional cavities 10 and 11 situated between them. The beam from the source 1 is projected past all four cavities in succession and falls finally upon a collector electrode 12 indicated as of the usual tapered end form. Input is applied to the cavity 3 by a co-axial or other feeder 8 and output is taken off from the cavity 4 by a feeder 9. The additional cavities 10 and 11 are coupled together by an external feedback path 13 which feeds back energy in the direction indicated by the arrow. The energy fed back is insufficient to cause self-oscillation. If desired, an adjustable attenuator (not shown) may be provided in the feedback path 13. Suitable positive potential is applied as shown from the potential source 6. Bandwidth may be improved by tuning the cavities 10 and 11 to a frequency slightly different from the resonant frequency of the output cavity 4. If desired, additional pairs of cavities, like the cavities 10 and 11 and back-coupled in the same way, may be provided between the input and output cavities, but this, in general, will not be necessary or, from the viewpoint of simplicity, desirable. The arrangement of Fig. 2, though involving a more complex tube than that of Fig. 1, is particularly suitable for use when very high gain or very high output power (or both) are required. For, example, gains of the order of 50 db at 10,000 mc./s. can be obtained and it is possible to achieve output powers of more than 10 watts (mean) at this frequency.

In Figs. 1 and 2 the resonators are illustrated as cavity resonators and are of so-called "lumped constants" design. "Lumped constants" resonators may, however, be replaced by resonators of the distributed constant type, e.g. any of the resonators shown could be replaced by a short length of helix through which the beam passes axially.

We claim:

1. A high gain microwave amplifier of the kind in which amplification is obtained by interaction between an electron beam and at least one resonator coupled thereto and adapted to modulate the velocity of the electrons thereof, said amplifier comprising an electron beam source, an input resonator coupled to said beam, means for applying input signals to said resonator to modulate said beam in accordance therewith, an output resonator coupled to said beam to take amplified output from the electrons thereof after they have passed and been modulated by the input resonator, said input and output resonators being resonant at substantially equal frequencies, means for taking output signals directly from said output resonator, and means for applying feedback reaction, insufficient to cause self-oscillations, over at least one intermediate length of said modulated beam which is beyond said input resonator in the direction of electron flight, said intermediate length being a length over which said modulated beam remains modulated in accordance with said input signals, wherein the feedback reaction means comprises at least one pair of additional resonators situated between the input resonator and the output resonator and coupled to the electrons of the beam at the opposite ends of an intermediate length thereof, and a feedback path so dimensioned as to provide positive energy feedback between that additional resonator which is nearer the output resonator and the other additional resonator.

2. An amplifier as claimed in claim 1, wherein the tuning of the additional pair of back coupled resonators is slightly different from that of the output resonator.

3. A high gain microwave amplifier comprising an electron beam source adapted to project a beam of electrons towards a collector electrode, an input resonator coupled to said beam near said source, means for applying signals to be amplified to the input resonator to modulate said beam in accordance therewith, an output resonator coupled to said beam near said collector electrode, a pair of additional resonators coupled to said beam at spaced points along the same at which said beam remains modulated in accordance with said input signals, said points being situated between the input and output resonators, a feedback path so dimensioned as to provide positive energy feedback from that resonator of said pair nearer the output resonator to the other resonator of said pair, means for taking off amplified signals from the output resonator and means for applying operating potentials dimensioned to cause the electrons of the beam to proceed from the source past the resonators to said collector electrode to be collected thereby.

References Cited in the file of this patent

UNITED STATES PATENTS

| | | |
|---|---|---|
| 2,379,819 | Mason | July 3, 1945 |
| 2,416,303 | Parker | Feb. 25, 1947 |
| 2,570,289 | Touraton et al. | Oct. 9, 1951 |

OTHER REFERENCES

Blitz: Abstract of application Serial Number 703,091, published Sept. 20, 1949, 626 O.G. 872.